July 11, 1961 N. W. SMIT ET AL 2,992,286
FURNACE FOR TREATING CERAMIC PRODUCTS
Filed June 6, 1958 2 Sheets-Sheet 1

INVENTORS
NICOLAAS WILLEM SMIT
BRALT RINZE SCHAT
BY
AGENT

July 11, 1961 N. W. SMIT ET AL 2,992,286
FURNACE FOR TREATING CERAMIC PRODUCTS
Filed June 6, 1958 2 Sheets-Sheet 2

INVENTORS
NICOLAAS WILLEM SMIT
BRALT RINZE SCHAT
BY
AGENT

United States Patent Office 2,992,286
Patented July 11, 1961

2,992,286
FURNACE FOR TREATING CERAMIC PRODUCTS
Nicolaas Willem Smit and Bralt Renze Schat, Eindhoven, Netherlands, assignors to North American Philips Company, Inc., New York, N.Y., a corporation of Delaware
Filed June 6, 1958, Ser. No. 740,488
5 Claims. (Cl. 13—20)

The present invention relates to a furnace for treating ceramic products. More particularly, the invention relates to a furnace for treating ceramic products of elongated shape, for instance rods, tubes or strips, this furnace comprising a channel which can be heated and through which the products can be moved. Such furnaces are known. The ceramic material to be treated, supported in firing pots or capsules, is moved through a spacious heating flue. The heat capacity of such furnaces is high and the firing process is performed relatively slowly.

The invention has for its object to provide a furnace for the said purpose, which has a considerably lower heat capacity, whilst the productivity is maintained, the furnace occupying less space and permitting a rapid performance of the heating process, whilst the quality of the product for example rods, tubes or strips of ceramic material for capacitors, is improved.

In accordance with the invention the firing flue of the furnace is formed by a gap between heating elements or heating walls, this gap having preferably near the top side a guide to move members along it, for example apertured plates, which permit the supporting of the products. The use of the firing pots is eliminated with this new furnace, which is an important advantage.

The heating conditions in such a gap-shaped flue require special attention.

In one embodiment of the invention, heating elements of elongated shape are arranged in a longitudinal direction on either side of and, if desired, over the gap. One terminal portion of the furnace is removable, for example on wheels, in this longitudinal direction in a manner such that the heating elements can be exchanged. Thus the heat distribution in the furnace is improved with respect to the case where a lid is lifted to exchange the elements.

Owing to impact radiation from the heat zone in the case of an abrupt cooling at the outlet of the heat zone in the furnace, the suspended products are liable to warp. With an embodiment of the invention this is avoided by covering the part of the heating elements near the outlet end of the gap by the conducting plates, for example of silicon carbide and by raising the bottom of the gap (the floor of the furnace) at the said end. It should be considered that during the sintering process in the furnace the products exhibit a material shrinkage of, for example 20%, so that they become shorter. In order to render the firing conditions for the products at the outlet of the heat zone as far as possible equal to those in the other part of this zone, the measures referred to with the last-mentioned embodiment are taken.

At the inlet of the furnace the gap below the guide is preferably wider than the gap at other joints in the furnace. This prevents the suspended products, which are likely to warp during the combustion of the organic binder in the products and due to the unilateral firing from touching the wall of the furnace.

The drawing shows diagrammatically one embodiment of a furnace according to the invention:

Figure 3:
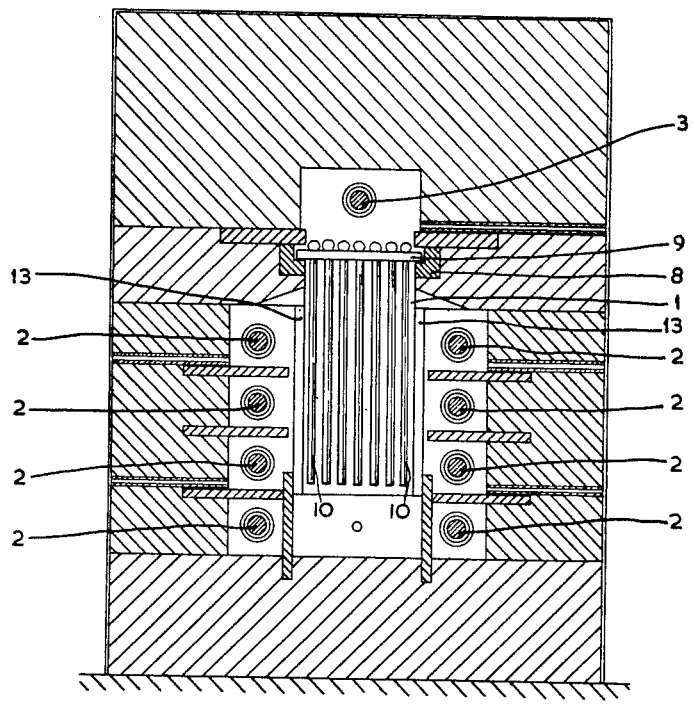
FIG. 3 is a cross sectional view taken on the line III—III of FIG. 1

As is evident from FIG. 3 a gap-shaped channel 1 is formed between blocks or stones of refractory material.

The channel 1 is heated on either side and on the top by heating elements 2, 3 arranged in a longitudinal direction along the furnace. The heating elements 2, 3 may comprise for example, so-called Globar rods, to which electric current is supplied at 4.

Figures 1, 2:
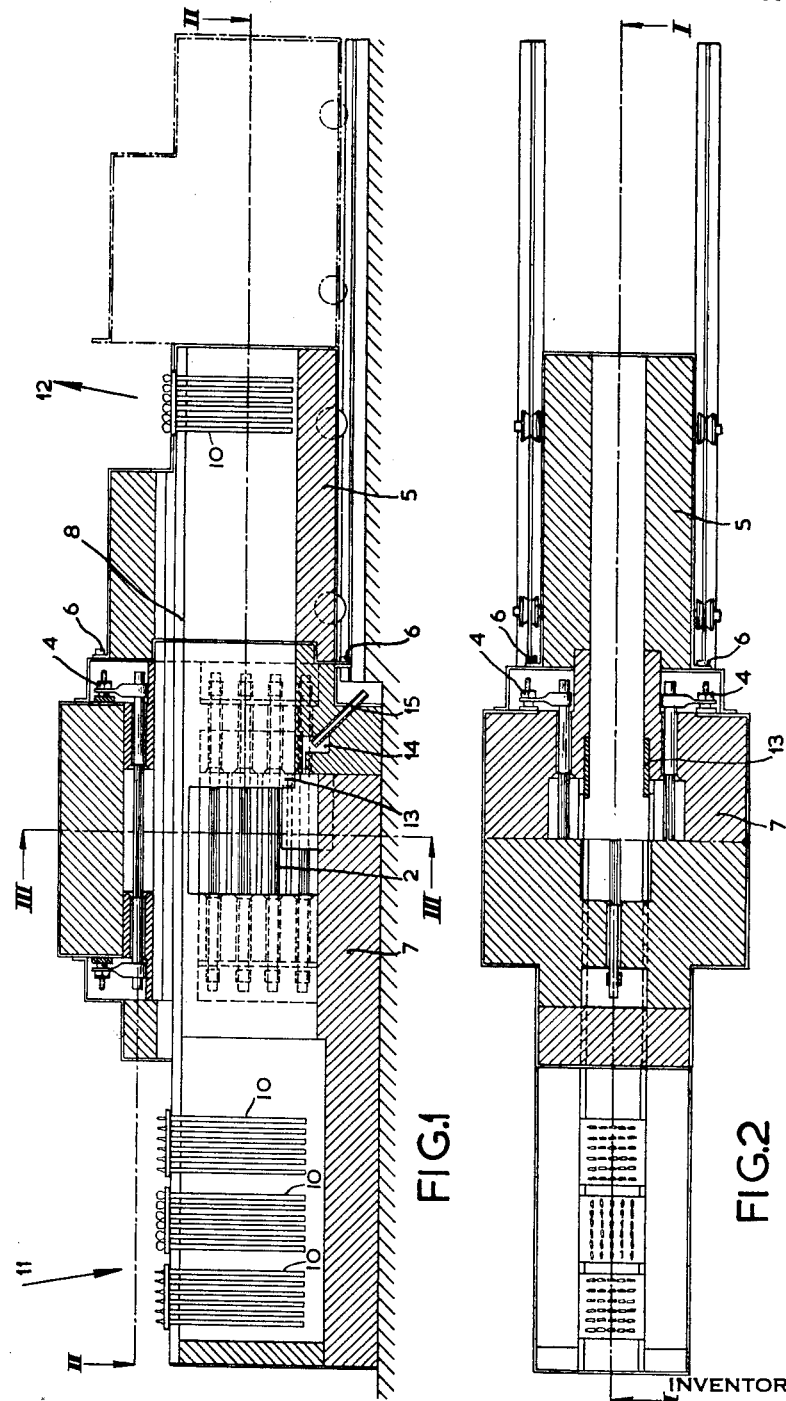
FIG. 1 is a longitudinal sectional view of an embodiment of the furnace of the present invention.
FIG. 2 is a sectional view taken on the line II—II of FIG. 1.

As an alternative, other heating elements such as for example, helically-wound resistance wire, may be utilized. A portion 5 of the furnace is removable on wheels. When this portion is detached at 6 from the main portion 7 of the furnace, it can be transported to the right (FIGS. 1 and 2). The heating rods 2, 3 are then accessible and may be exchanged.

On the top side in the gap provision is made of a guide 8 (FIG. 3) for apertured plates 9, which can be moved through the furnace by means of a mechanism (not shown) and on which the products 10 are suspended (see FIG. 3).

The products with the plates 9 are inserted at 11 and are removed from the furnace at 12. At the end of the gap, the heating rods 2 are covered by heat-conducting SiC plates 13. These plates constitute what is known as a muffling wall. The floor of the gap is raised at this area, as indicated at 14.

Through a duct 15 gas, for example oxygen, may be introduced into the gap space.

Both the heat distribution in the furnace and the warping of the products may be acted upon by controlling the flow of gas in the furnace, for example by drawing off or blowing in gas such as air, at given areas.

What is claimed is:

1. A furnace for treating ceramic objects of substantially elongated shape, comprising a bottom portion of refractory material, a top portion of refractory material, side portions of refractory material forming a longitudinally extending channel with said top and bottom portions, a plate constructed and arranged to support a plurality of said objects in substantially vertical position, longitudinally extending guide means for said plate provided in said top portion thereby permitting movement of the said plate in a longitudinal direction from one end of said channel to the other, a plurality of heating elements positioned in said refractory material, and means for removing a section of said refractory material at one end of said channel thereby to permit access to said heating elements.

2. A furnace for treating ceramic objects of substantially elongated shape, comprising a bottom portion of refractory material, a top portion of refractory material, side portions of refractory material forming a longitudinally extending channel with said top and bottom portions, a plate constructed and arranged to support a plurality of said objects in a substantially vertical position, longitudinally extending guide means for said plate provided in said top portion thereby permitting movement of the said plate in a longitudinal direction from one end of said channel to the other, a plurality of heating elements positioned in said refractory material, means for removing a section of said refractory material at one end of said channel thereby to permit access to said heating elements, and heat conducting plates covering part of said heating elements adjacent one end of said channel.

3. A furnace for treating ceramic objects of substantially elongated shape, comprising a bottom portion of refractory material, a top portion of refractory material, side portions of refractory material forming a longitudinally extending channel with said top and bottom portions, said top and bottom portions being spaced closer together at one end of said channel than at the other end of the said channel, a plate constructed and arranged to support a plurality of said objects in substantially vertical position, longitudinally extending guide means for said plate provided in said top portion thereby permitting movement of the said plate in a longitudinal direction from one end of said channel to the other, a plurality of heating elements positioned in said refractory material, and means for removing a section of said refractory material at one end of said channel thereby to permit access to said heating elements.

4. A furnace for treating ceramic objects of substantially elongated shape, comprising a bottom portion of refractory material, a top portion of refractory material, side portions of refractory material forming a longitudinally extending channel with said top and bottom portions, said side portions being spaced farther from each other at one end of said channel than at the other end of the said channel, a plate constructed and arranged to support a plurality of said objects in substantially vertical position, longitudinally extending guide means for said plate provided in said top portion thereby permitting movement of the said plate in a longitudinal direction from one end of said channel to the other, a plurality of heating elements positioned in said refractory material, and means for removing a section of said refractory material at one end of said channel thereby to permit access to said heating elements.

5. A furnace for treating ceramic objects of substantially elongated shape, comprising a bottom portion of refractory material, a top portion of refractory material, side portions of refractory material forming a longitudinally extending channel with said top and bottom portions, said side portions being spaced farther from each other at one end of said channel than at the other end of the said channel, said top and bottom portions being spaced closer together at said other end of said channel than at said one end of said channel, a plate constructed and arranged to support a plurality of said objects in substantially vertical position, longitudinally extending guide means for said plate provided in said top portion thereby permitting movement of the said plate in a longitudinal direction from one end of said channel to the other, a plurality of heating elements positioned in said refractory material, means for removing a section of said refractory material at said other end of said channel thereby to permit access to said heating elements, and heat conducting plates covering part of said heating elements adjacent said other end of said channel.

References Cited in the file of this patent

UNITED STATES PATENTS

| | | |
|---|---|---|
| 15,111 | Howe et al. | June 10, 1856 |
| 669,567 | Waterman | Mar. 12, 1901 |
| 1,562,441 | Curtis | Nov. 14, 1925 |
| 1,868,091 | Brooke | July 19, 1932 |
| 1,874,064 | Robertson | Aug. 30, 1932 |
| 2,100,222 | McFarland | Nov. 23, 1937 |
| 2,534,518 | Jeppson | Dec. 19, 1950 |
| 2,582,855 | Vander Pyl | Jan. 15, 1952 |
| 2,618,671 | Vander Pyl | Nov. 18, 1952 |
| 2,624,930 | Weingrad | Jan. 13, 1953 |
| 2,809,822 | Gier | Oct. 15, 1957 |

FOREIGN PATENTS

| | | |
|---|---|---|
| 546,449 | Great Britain | July 14, 1942 |
| 669,567 | Great Britain | Mar. 12, 1901 |